United States Patent
Ruetz et al.

(10) Patent No.: US 8,731,943 B2
(45) Date of Patent: May 20, 2014

(54) SYSTEMS, METHODS AND AUTOMATED TECHNOLOGIES FOR TRANSLATING WORDS INTO MUSIC AND CREATING MUSIC PIECES

(75) Inventors: Nicolle Ruetz, Miami Beach, FL (US); David Warhol, Manhattan Beach, CA (US)

(73) Assignee: Little Wing World LLC, Miami, FL (US)

( * ) Notice: Subject to any disclaimer, the term of this patent is extended or adjusted under 35 U.S.C. 154(b) by 930 days.

(21) Appl. No.: 12/700,839

(22) Filed: Feb. 5, 2010

(65) Prior Publication Data

US 2011/0196666 A1    Aug. 11, 2011

(51) Int. Cl.
| | |
|---|---|
| G06F 17/20 | (2006.01) |
| G06F 17/28 | (2006.01) |
| G06F 17/27 | (2006.01) |
| G06F 17/21 | (2006.01) |
| G10L 13/00 | (2006.01) |
| G10L 13/08 | (2013.01) |
| G10L 21/00 | (2013.01) |
| G10L 21/06 | (2013.01) |

(52) U.S. Cl.
USPC ............ 704/277; 704/2; 704/3; 704/4; 704/8; 704/9; 704/10; 704/258; 704/260; 704/270; 704/270.1; 704/275; 704/276; 704/278

(58) Field of Classification Search
USPC ............... 704/2, 3, 4, 8, 9, 10, 258, 260, 270, 704/270.1, 275, 276, 277, 278; 84/609, 84/610, 634, 649, 650
See application file for complete search history.

(56) References Cited

U.S. PATENT DOCUMENTS

| | | | |
|---|---|---|---|
| 4,984,230 A | 1/1991 | Satoh et al. | |
| 5,146,833 A | 9/1992 | Lui | |
| 5,953,005 A * | 9/1999 | Liu | 715/243 |
| 6,075,193 A | 6/2000 | Aoki et al. | |
| 6,346,667 B2 | 2/2002 | Ishii | |
| 6,931,377 B1 * | 8/2005 | Seya | 704/277 |
| 6,990,453 B2 * | 1/2006 | Wang et al. | 704/270 |
| 7,034,217 B2 * | 4/2006 | Pachet | 84/609 |
| 7,062,437 B2 * | 6/2006 | Kovales et al. | 704/260 |
| 7,424,682 B1 * | 9/2008 | Pupius et al. | 715/758 |
| 7,613,612 B2 * | 11/2009 | Kemmochi et al. | 704/264 |
| 8,134,061 B2 * | 3/2012 | Feeney et al. | 84/477 R |
| 8,484,026 B2 * | 7/2013 | Lin | 704/258 |
| 2002/0194984 A1 * | 12/2002 | Pachet | 84/609 |

(Continued)

FOREIGN PATENT DOCUMENTS

| | | |
|---|---|---|
| EP | 1132887 A3 | 7/2004 |
| WO | WO0169499 A2 | 9/2001 |
| WO | WO2008002054 A1 | 1/2008 |

OTHER PUBLICATIONS

International Search Report and Written Opinion for PCT/US2011/021642 Mar. 18, 2011.

(Continued)

*Primary Examiner* — Edgar Guerra-Erazo
(74) *Attorney, Agent, or Firm* — Norman E. Brunell

(57) ABSTRACT

Systems, methods and computer program products are provided for translating a natural language into music. Through systematic parsing, music compositions can be created. These compositions can be created by one or more persons who do not speak the same natural language.

11 Claims, 3 Drawing Sheets

(56) References Cited

U.S. PATENT DOCUMENTS

| | | | |
|---|---|---|---|
| 2003/0159568 A1* | 8/2003 | Kemmochi et al. | 84/626 |
| 2004/0099126 A1* | 5/2004 | Kawashima | 84/609 |
| 2004/0152054 A1* | 8/2004 | Gleissner et al. | 434/156 |
| 2005/0160089 A1 | 7/2005 | Fujita et al. | |
| 2005/0223071 A1* | 10/2005 | Hosono | 709/206 |
| 2005/0255431 A1* | 11/2005 | Baker | 434/169 |
| 2006/0254409 A1* | 11/2006 | Withop | 84/601 |
| 2007/0193437 A1* | 8/2007 | Kong et al. | 84/610 |
| 2007/0289432 A1* | 12/2007 | Basu et al. | 84/609 |
| 2007/0291025 A1* | 12/2007 | Paihonen | 345/213 |
| 2007/0294076 A1* | 12/2007 | Shore et al. | 704/2 |
| 2008/0215170 A1* | 9/2008 | Milbrandt et al. | 700/94 |
| 2008/0220797 A1 | 9/2008 | Meiby et al. | |
| 2008/0243472 A1* | 10/2008 | DeGroot et al. | 704/2 |
| 2008/0300702 A1* | 12/2008 | Gomez et al. | 700/94 |
| 2008/0319735 A1 | 12/2008 | Kambhatla et al. | |
| 2009/0083035 A1 | 3/2009 | Huang et al. | |
| 2009/0083281 A1* | 3/2009 | Sarig et al. | 707/10 |
| 2009/0106015 A1 | 4/2009 | Li et al. | |
| 2009/0160859 A1* | 6/2009 | Horowitz et al. | 345/440 |
| 2009/0204389 A1* | 8/2009 | Wang et al. | 704/7 |
| 2009/0285474 A1 | 11/2009 | Berteau | |
| 2009/0306960 A1* | 12/2009 | Katsumata | 704/8 |
| 2009/0316885 A1 | 12/2009 | Mahmud | |
| 2010/0018382 A1* | 1/2010 | Feeney et al. | 84/615 |
| 2011/0097693 A1* | 4/2011 | Crawford | 434/157 |
| 2011/0137920 A1* | 6/2011 | Cohen et al. | 707/748 |

OTHER PUBLICATIONS

Convert Typed Words into a Song—Let them Sing it for For You, Retrieved from http://www.sr.se/p1/Src/Sing on Feb. 4, 2010, 1 page.
Freely Offered, Retrieved from http://www.freelyoffered.com/blog/xware_notions/blindly_created_music.html, on Feb. 5, 2010, 1 page.
Lipsound, Retrieved from httpA://scienceuncoiled.co.uk/su137.doc on Feb. 5, 2010, pp. 290-291.
Sony Ericsson W350i Walkman Phone—Do you speak music?, Retrieved from http://wonyericssson.com/experiencemusic on Feb. 5, 2010, 1 page.

* cited by examiner

Figure 3

SYSTEMS, METHODS AND AUTOMATED TECHNOLOGIES FOR TRANSLATING WORDS INTO MUSIC AND CREATING MUSIC PIECES

FIELD OF THE INVENTION

The present invention pertains to the field of music generation.

BACKGROUND OF THE INVENTION

Communication among people who live far away from one another and have different cultural experiences can be rewarding. It can both help individuals to feel connected to the global community and allow them to learn about other people. Over the past decade and a half, the Internet has enabled people who live thousands of kilometers apart to contact one another with relative ease and thereby has facilitated communication over these long distances. This type of communication is particularly attractive because people who cannot easily meet face to face can both inexpensively and rapidly communicate over the Internet through emails and in chat rooms.

Unfortunately, even with the increased availability of the Internet there remains at least one significant limitation on the ability of people from different countries to communicate. There is a lack of a common language.

Music, which may be appreciated by speakers of any language, has the potential to bridge the gap between persons who cannot communicate directly with one another. For example, audience members at an opera often do not speak the language in which the opera was written yet thoroughly enjoy the performances. Similarly, it is not uncommon for a symphony to play to an audience that is comprised of members, some of whom, because of a language barrier, cannot communicate directly with one another.

However, other than the actors and musicians who are performing, the people at an opera or symphony passively experience the music. Moreover, audience members rarely communicate directly with one another. Thus, to date, music has been underutilized as a tool for bringing together speakers of different languages to communicate and to collaborate.

SUMMARY OF THE INVENTION

The present invention is directed to the use of technology to enable persons to create music compositions. Through the use of the systems, methods and computer technologies of the present invention, one may easily and efficiently create music compositions from text. The music compositions may be created by one person or a plurality of persons who share the creative experience and/or the final product.

According to a first embodiment, the present invention is directed to a non-transitory tangible computer readable storage medium comprising a set of executable instructions that are capable of directing a computer to execute the following steps: (a) parsing a text message, thereby obtaining a parsed message comprised of a plurality of parsed word elements in a word order; (b) accessing a database wherein in the database a plurality of parsed word elements are cross-referenced to one or more music elements; and (c) playing a music composition comprised of a plurality of music elements, wherein the plurality of music elements are arranged in an order that corresponds to the word order.

The parsing step applies a set of grammar rules, such as one or more of the following: removal of superfluous or undesired words; identification and grouping of compound words; and identification of verb tenses. The end of this step results in the creation of a sequential annotated array of word identifiers (i.e., parsed word elements) that are representative of the music composition that will correspond to the text. In some embodiments, the result of the array for each word may, for example, comprise the following: <<word root>>, <<part of speech>>, <<word tense>>, <<singular or plural>>, <<word prefix>>, and <<word suffix>>. For any of these variables that are not applicable for a particular word, the value in the array would be null.

Alternatively, a simpler array could be created that is {<<word>>, <<word>>,<<word>> and if the word is a verb, <<word/verb tense>>}, wherein the verb tense change causes a change in playback such as reverberation.

The next step, accessing a database, calls for searching through a database that is a dictionary or library of pre-composed musical phrases. The search is for a single pre-composed musical phrase that is associated with each parsed word element (i.e., particular word identifier) in the annotated array. For any words that are not in the dictionary/library, the automated computer program product may execute a set of instructions that breaks the word identifier into its component letters and replaces each letter with a musical phrase associated with that letter of the alphabet.

During playback, in strict music meter (i.e. a preselected meter), the instructions cause the triggering of each musical phrase that is associated with each parsed word element in the annotated array. In one embodiment, the music associated with each word is composed in multiples of eighth notes. Thus, when the music elements are combined, they are combined in increments of eighth notes, on eighth note boundaries, such that the meter (tempo, flow, beat, etc.) of the music is continuous, static, and regular. Persons of ordinary skill in the art will appreciate that the invention is also applicable when the predetermined or preselected meter is other than eighth notes, e.g., half notes, whole notes, quarter notes, sixteenth notes, etc.

Thus, for each word identifier in sequence, the instructions call for waiting a specific number of music beats for the music phrase to complete; the number corresponds to the number of beats in the pre-composed musical phrase and the start of the next musical phrase for the next word identifier at the next music beat opportunity. In some embodiments, some words are longer and some are shorter, but regardless of the length, the next word starts at the next eight note opportunity after the previous word completes.

The non-transitory tangible computer readable storage medium may also contain executable instructions that are capable of playing the music composition in metered time, tempo and/or pitch with short pre-recorded compositions (also known as samples) of e.g., rhythmic percussion and instrument sounds that automatically, seamlessly and continuously repeat in what is commonly know as a "loop", until the music composition is complete.

The non-transitory computer readable storage medium may also contain a set of executable instructions that further comprises instructions for attaching a file to an email or to an SMS message, wherein the file comprises the music composition and the textual message.

According to a second embodiment, the present invention is directed to a method for translating a text message into a music composition. This method comprises the steps of: (a) receiving a first text message comprised of words inputted through a user interface; (b) parsing the text message through an automated computer parsing program to obtain a parsed message comprised of a plurality of parsed word elements, wherein said plurality of parsed word elements are in a word order that corresponds to the order of the text; (c) accessing a database that correlates parsed word elements to one or more music elements; (d) creating a music composition, wherein the music composition comprises music elements that correspond to the parsed word elements and the music elements are in the order of the parsed word elements; and (e) outputting the music composition in a format that may be converted into audio output and/or stored in digital or analog form.

According to a third embodiment, the present invention is directed to a system for enabling a plurality of users to create a music composition, wherein the plurality of users comprises at least a first user and a second user, said system comprising: (a) a first computer, wherein the first computer comprises (1) a first graphic user interface; (2) a first computer program product, wherein the first computer program product comprises: (i) a first text parsing module; (ii) a first cross-referencing module, wherein the first cross-referencing module is operably coupled to the first text parsing module; and (iii) a first music output module, wherein the first music output module is operably coupled to the first cross-referencing module; and (3) a first portal, wherein the first computer is capable of transmitting a first message through the first portal and receiving a second message from a second portal; and (b) a second computer, wherein the second computer comprises (1) a second graphic user interface; (2) a second computer program product, wherein the second computer program product comprises: (i) a second text parsing module; (ii) a second cross-referencing module, wherein the second cross-referencing module is operably coupled to the second text parsing module; (iii) a second music output module, wherein the second music output module is operably coupled to the second cross-referencing module; and (3) a second portal, wherein the second computer is capable of receiving the first message from the first computer through the second portal and transmitting the second message. A computer is considered to comprise a computer program product regardless of whether the computer program product is stored on the hardware of the computer, as part of software that is reversibly engaged with the computer (e.g., a removable disk), or remotely obtained from a website. A non-limiting example of a computer is a smart phone. A "smart phone" is a mobile phone offering advanced capabilities such as e-mail, internet access, music, video, game applications and a keyboard, often with computer-like functionality.

In some embodiments, one or more of the following features may be present: (1) the ability to translate input from one language to another language, prior to parsing; (2) the ability to trigger an accompanying background music track that plays in the same music meter or a different meter as the sequenced music phrases; (3) the ability to assign different audio playback effects, such as distortion of the musical phrase of each verb and verb object based on the tense of the verb; and (4) the ability to substitute pre-composed music phrases with equivalent pre-composed music phrases that are played with other musical instrument sounds (timbres), keys and tempos and at the same time substitute any accompanying background music track with other keys and tempos that match those selected for the pre-composed musical phrases. When the translation function is used, and the music composition is created from a single natural language, the word order and thus the music order will be consistent. Thus, even if users input portions of the conversation in different languages and the two language have different grammatical rules, the output music will not change if the user herself translates a sentence into, for example, English, or if the translation module does it.

Alternatively, in embodiments in which two or more different natural languages are translated into music, because of the different rules of those languages it is possible that the order of the elements of the music output will change based on the language that was used for input.

Through the computer readable storage media, methods and systems of the present invention, one can facilitate the creation of music, as well as engage a plurality of persons to collaborate on the creation of a musical composition. By using a set of grammar rules that simplifies complex language constructions so that translations of words or phrases are consistent or normalized across multiple languages, the present invention creates a user friendly way to convert text to music. Furthermore, in some embodiments, the musical words may be arranged in metered time so the music flows without breaks, regardless of whether there is a change in author. The musical melody dialogue can be combined in metered time and pitch with different pre-recorded loop compositions of different musical genres, (e.g., rock, reggae, jazz, etc.) thereby efficiently synthesizing the musical words melody into composite musical pieces. These musical pieces can be shared in a chat room or sent by email or attached to a smart phone, cell phone text message. The files may also be saved in MP3 format.

BRIEF DESCRIPTION OF THE FIGURES

FIG. 3 is a translated musical piece that shows the text words to which the parts of a music score corresponds.

DETAILED DESCRIPTION OF THE INVENTION

Figure 1:
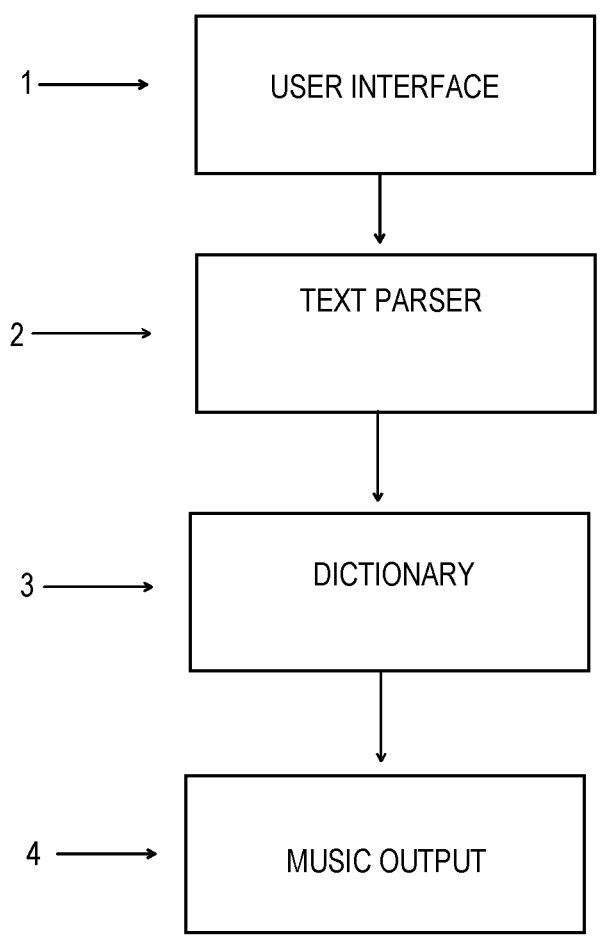
FIG. 1 is a representation of the overview of a system and process of the present invention.

Through the use of the systems, methods and computer storage medium of the present invention, one may create music compositions and facilitate the communication and collaboration between speakers of different languages.

According to a first embodiment, the present invention is directed to a non-transitory tangible computer readable storage medium comprising a set of executable instructions. A "non-transitory tangible computer readable storage medium" may also be referred to as a computer program product, and includes hardware, software or a combination of the two on which one may store a set of instructions that may be used to direct a computer to perform a set of steps. Examples of non-transitory tangible computer readable storage medium include, but are not limited to, a hard drive, a hard disk, a floppy disk, a thumb drive, a computer tape, ROM, EEPROM, nonvolatile RAM, CD-ROM and a punch card. Thus, in some embodiments the instructions are software stored on a medium that can instruct a computer device having one or more of the following hardware components: memory, storage, an input device, an output device and a central processing unit.

The instructions are capable of directing a computer to execute the following steps: (a) parse a text message, thereby obtaining a parsed message comprised of a plurality of parsed word elements in a word order; (b) access a database wherein in the database each of a plurality of parsed word elements are cross-referenced to music elements; and (c) play a music composition comprised of a plurality of music elements, wherein the plurality of music elements are arranged in an order that corresponds to the word order. The instructions for each of these steps may be stored in one computer program or a set of computer programs or modules that are operably coupled to one another. The phrase "operably coupled" means configured or otherwise designed to permit interaction and operation in the intended manner for the intended purpose. The instructions may be written in any computer language that permits the instructions described herein to be activated and to accomplish their intended functions. Examples of suitable programming languages include, but are not limited to, JAVASCRIPT and ACTIONSCRIPT.

A text message is a message that is created in a language. Typically, a text message contains words that are all part of the same language that has rules such as syntax. These types of languages may be referred to as natural languages. A text message could be a word, phrase, sentence, paragraph or longer. Examples of natural languages include, but are not limited to, English, Spanish, French, Italian, German, Greek, Hungarian, Czech, Polish, Dutch, Swedish, Danish, Russian, Hebrew, Urdu, Hindi, Portuguese, Korean, Chinese, Japanese, Vietnamese, etc. (A "text message" is not limited to messages sent by SMS technologies.)

In some embodiments, the text message is formed from words in one of the aforementioned languages. In other embodiments, a user creates a text message that contains words from two or more of these languages. The text message could also be created through a pictorial language such as PECES ("Picture Exchange Communication System") or a sign language such as American Sign Language, if there is either an appropriately configured parsing set of instructions to receive this type of input, or a translation module that will translate these forms of inputted messages into a natural language that can be parsed.

The parsing instructions direct the computer to apply a set of rules to the text message in order to standardize it, and to pick up syntax clues. For example, in English the parser may remove articles such as "an" or "a" or "the." In some embodiments, the parser may also review the message and appropriately designate parts of speech such as adverbs or infinitives or gerunds. The result of a parsing functionality is a set of parsed word elements. A parsed word element may, for example, be a meaning of a word or the part of speech of a word. A parsed word element may also be referred to as a "token." Thus, any word may have a plurality of word elements or tokens. The parser may recognize the start and end of a word to be parsed based on the white space that surrounds that word.

Parsing may, for example, be accomplished through the use of a lexical analyzer. Automated systems for parsing natural language are known to persons of ordinary skill in the art. Some lexical parsers employ automated morphologic (which refers to the structure of words), syntactic (which refers to the structure of sentences) and semantic (which refers to the meaning of words) analysis techniques in order to extract and to process grammatical and/or linguistic features of a natural language. The parsing is performed based on a set of rules as defined by the target language. A description of known strategies of automating analysis natural language systems is described in the background of U.S. Pat. Pub. No. 2008/0319735 at paragraphs [0002]-[0007], which is incorporated by reference as if set forth fully herein.

Example 1 below provides a set of parsing rules that may be employed.

In some embodiments, the instructions may contain one parsing module that is configured to parse only one natural language. Alternatively, there may be a plurality of parsing modules that are configured to parse a plurality of natural languages. In those latter cases the parsing module may contain a language identification module that determines the language or a user language selection module that permits a user to select the language in which parsing should occur.

In other embodiments, there is a translation module or set of instructions that is capable of translating a text message from a first language, (for example, Spanish) to a second language, (for example, English) and then parsing the translated message based on the English text. In embodiments that possess this translation module, a user who enters the message in English could skip the translation step while a user who types in another language could activate that feature.

The result of the parsing may be referred to as a parsed message. The parsed message retains the word order of the text message. Each unit of the parsed message may be referred to as a parsed word element.

Pursuant to the instructions embodied on the computer readable storage medium, the computer accesses a database that may be either local or remote. Some users prefer to work locally and not maintain connections to networks or to a website. Accordingly, a user when first gaining access to the product may either download it from a website or install off of, e.g., a disk. Other users may, due to memory constraints, prefer to work on-line, and thus the database may be stored remotely.

The database is configured such that for each parsed element there is an association with a music element. A music element may be comprised of one or more music notes.

In some embodiments, the database may be a dictionary or library of pre-composed musical phrases that are stored in digital playback files that contain each musical phrase. In other embodiments, the annotation of the array of musical phrases contains each individual component musical note of the phrase instead of the phrase in its entirety. In these cases, the playback method triggers each individual note and waits for the appropriate duration of the individual component musical note before triggering the individual notes instead of triggering each pre-composed musical phrase.

After each parsed word element of the parsed message has been associated with a music element, a music composition may be formed that comprises the music elements. The instructions for generating the composition may include a first in, first out protocol such that the first parsed word element in generates a first music element, and the second parsed word element in generates the second music element out, etc. For words that are in the database, music elements may be defined not by the sound of the word, but by its meaning and in some embodiments one or more of its syntactic elements, such as part of speech and/or relationship to other words. If the word is not in the database, then a new set of one or more music notes or elements may be created for that word. The new set of music notes or elements may be determined by a standard protocol that is, for example, based on the phonemes of the word or the new set of elements may be selected from a predefined list of choices or the new set of elements may be created by a user.

The dictionary may also be defined such that synonyms have the same set of music elements associated with them. For example, the same music element may be associated with the words BIG and LARGE. Similarly, there may be a consistent music element to show the future tense of a verb.

The system may further be defined such that for each word in the word text there is a set of one or more music elements such that the set has a duration of 0.25 seconds to 3.0 seconds.

After the music composition is generated, the instructions, when followed correctly, cause the computer to play the composition. In some embodiments, there is a preset standard tempo, meter and rhythm for the initial playing of this music.

The technology for playing music through a computer is well known to persons of ordinary skill in the art.

According to a second embodiment, the present invention is directed to a method for translating a text message into a music composition. The method comprising the steps of: (a) receiving a first text message through a user interface; (b) parsing the text message through an automated computer parsing program to obtain a parsed message comprised of a plurality of parsed word elements, wherein the plurality of parsed word elements are in an order; (c) accessing a database that correlates parsed word elements to one or more music elements; (d) creating a music composition, wherein the music composition comprises music elements that correspond to the parsed word elements and the music elements are in the order of the parsed words; and (e) outputting the music composition in an audio format. This method may be based on the instructions of the first embodiment.

The output may also be saved locally on a hard drive or on a disk or remotely over a network. The system may be configured to save any one or more of the text message, the parsed message and the music composition. In some embodiments, it may be worth saving at least the text message so that it will be editable at a later date.

According to a third embodiment, the present invention is directed to a system for enabling a plurality of users to create a music composition, wherein the plurality of users comprises at least a first user and a second user. For convenience, additional users may be referred to as a third user, a fourth user, a fifth user, a sixth user, etc.

The system comprises: (a) a first computer, wherein the first computer comprises (1) a first graphic user interface; (2) a first computer program product, wherein the first computer program product comprises: (i) a first text parsing module; (ii) a first cross-referencing module, wherein the first cross-referencing module is operably coupled to the first text parsing module; and (iii) a first music output module, wherein the first music output module is operably coupled to the first cross-referencing module; and (3) a first portal, wherein the first computer is capable of transmitting a first message through the first portal and of receiving a second message from a second portal; and (b) a second computer, wherein the second computer comprises (1) a second graphic user interface; (2) a second computer program product, wherein the second computer program product comprises: (i) a second text parsing module; (ii) a second cross-referencing module, wherein the second cross-referencing module is operably coupled to the second text parsing module; (iii) a second music output module, wherein the second music output module is operably coupled to the second cross-referencing module; and (3) a second portal, wherein the second computer is capable of receiving the message from the first computer through the second portal and of transmitting the second message through the second portal.

The systems of this embodiment may use the methods and products of the previous embodiments. For example, a first user sitting in New York, whose native language is English, may activate his computer through a first graphic user interface. Examples of graphic user interfaces include, but are not limited to, keyboard activated, mouse activated and/or touch screen activated computers, cellular telephones and televisions.

The computer may be a tool for accomplishing electronic communications. Thus, it may have specific software, including a browser that also standardizes communication with network servers. The server may be any device that is capable of receiving, delivering and sending email messages that are sent to it. Thus, a server may comprise a storage device, an input device, an output device, a memory device, a processor and a communication interface. The server may also be configured to host a chat room or to cause a chat room to be hosted on an http site at a remote location.

An input device is any device that may be used to input, to select and or to manipulate information. By way of example, input devices include, but are not limited to, a keyboard, a mouse, a graphic tablet, a joystick, a light pen, a microphone, and a scanner. An output device may be any device that enables a computer to present information to a user, and includes, but is not limited to, a video display, a printer, and an audio speaker.

A communication interface is a tool for receiving input and sending input. Thus, it is or is part of a portal or is operably coupled to a portal. By way of example, communication interfaces may include but are not limited to a modem, network interface card and requisite software such as for protocol conversion and data conversion to communicate though e.g., a LAN, WAN or otherwise over the Internet. A "portal" is a method, system or apparatus for connecting to a network. For example, a portal may be a means of accessing the Internet.

A memory device is a device that can store, retrieve or facilitate the retrieval of data. By way of example, a memory device may comprises one or more of Random Access Memory (RAM), Read Only Memory (ROM), a magnetic drive, a Digital Vidio Disk (DVD) drive, or removable media storage.

A processor is the part of a computer that can execute instructions and manipulate data. An example of a processor is a central processing unit.

In first user's natural language, which may be English, the first user may input a text message and activate a first text parsing module, which is located either locally on his computer or remotely over a network or at an http site. After he activates the parsing module, the message is parsed into parsed word elements. Next a cross-referencing module is activated that assigns one or more music elements to each parsed word element. After parsing is complete, a first user output module may be activated either automatically or only after receiving appropriate input from the user that he wishes to hear the music. The music output may then use the computer's hardware to generate an audio output of the music through, e.g., a speaker system.

The first user then, if the computer program contains the requisite module, may have one or more additional features. For example, there may be a store or save function that enables him to store the music composition. There may be an edit function that enables him to change the tempo, pitch and/or meter of the composition. There may be an instrument selection function that allows him to select the instruments to be used during a playback. There may be a combine feature that allows him to select from previously stored music, music that will be played at the same time or before or after the created composition. There may also be a display function that allows a user to simultaneously display his natural language message while playing the music. Further, there may be a feature that allows the text message to be displayed in one or more chosen languages.

There may also be a share feature. The share feature may enable sharing at one or more times. For example, in some embodiments, the share feature may enable the music composition to be sent over the Internet. In some embodiments, the text message may be shared instead of or in addition to the music composition. In other embodiments, the parsed message may be shared. In other embodiments, the share feature accesses a chat room.

A second user may be the recipient of the shared information, either via e-mail or the chat room. In some embodiments, the second user does not speak English. She would, however, be able to appreciate the musical composition.

The second user, after receiving the text message could respond with her own text message. (The first user's message may be referred to as a first text message, and the second user's message may be referred to as a second text message.) The system may be designed such that the two text messages become linked, and are capable of entering the parser together to form a jointly created composition. The system may be designed such that upon entry of the second text message, the music composition that corresponds to only the second text message is played while both the first user and the second user can play the music that corresponds to both the first text message and the second text message as a single music composition.

The system may be designed such that if the first user's text is entered in a first language (e.g., English) and the second user's text is entered in a second language (e.g., Spanish), the system first translates the second user's text into English and then links the two texts such that any stored text is all in English. Alternatively, the system may be designed such that the second user's text may be linked to the first user's text while in Spanish, and the composite text may be stored with part in each of the two languages. Regardless of how the texts are linked and stored, in some embodiments, each user has the ability to review all messages in one or more languages of his or her choosing.

Although the above embodiment is described with reference to two users, a larger plurality of users may work on the same composite piece. For example, there may be three, four, five, six or more than six users who are part of the same conversation and thus whose texts can become part of the same music composition.

In another embodiment, system and methods for translating words into music and synthesizing composite musical pieces is provided. In this embodiment, there may be an Internet website that permits a multi-participant chat room. As people in the chat room enter text on their local host computer, and as the local host computer plays text from remote chat room participants, the text is translated into music and the corresponding text-to-music composition is played on the local host computer, with optionally the related text being displayed in one or more language as chosen by each user. Any pre-composed music phrase files to be played that are not found on the local host computer may be downloaded from an Internet file server and then saved on the local host computer in a cache for later reference. Messages from different chat room participants are queued to play sequentially.

In some embodiments, the system may be created such that after a text conversation in converted into music, the music output is seamless and a listener could not be able to determine who generated which text. In other embodiments, there may be playback effects that can be selected to denote the different texts by for example, tempo, pitch, meter or timbre.

Through the computer readable storage media, methods and systems of the present invention, one can facilitate the creation of music, as well as engage a plurality of persons to collaborate on the creation of a musical piece.

Various embodiments of the present invention may be further understood by reference to the accompanying figures. FIG. 1 is a flow chart that represents an embodiment of the present invention. Through a user interface 1, a user inputs a text message. A computer applies a text parser to the text message 2. After the message has been parsed, the computer accesses a dictionary 3, in order to assign a music element to each token of the parsed message, thereby forming a music composition and output the music 4.

Figure 2:
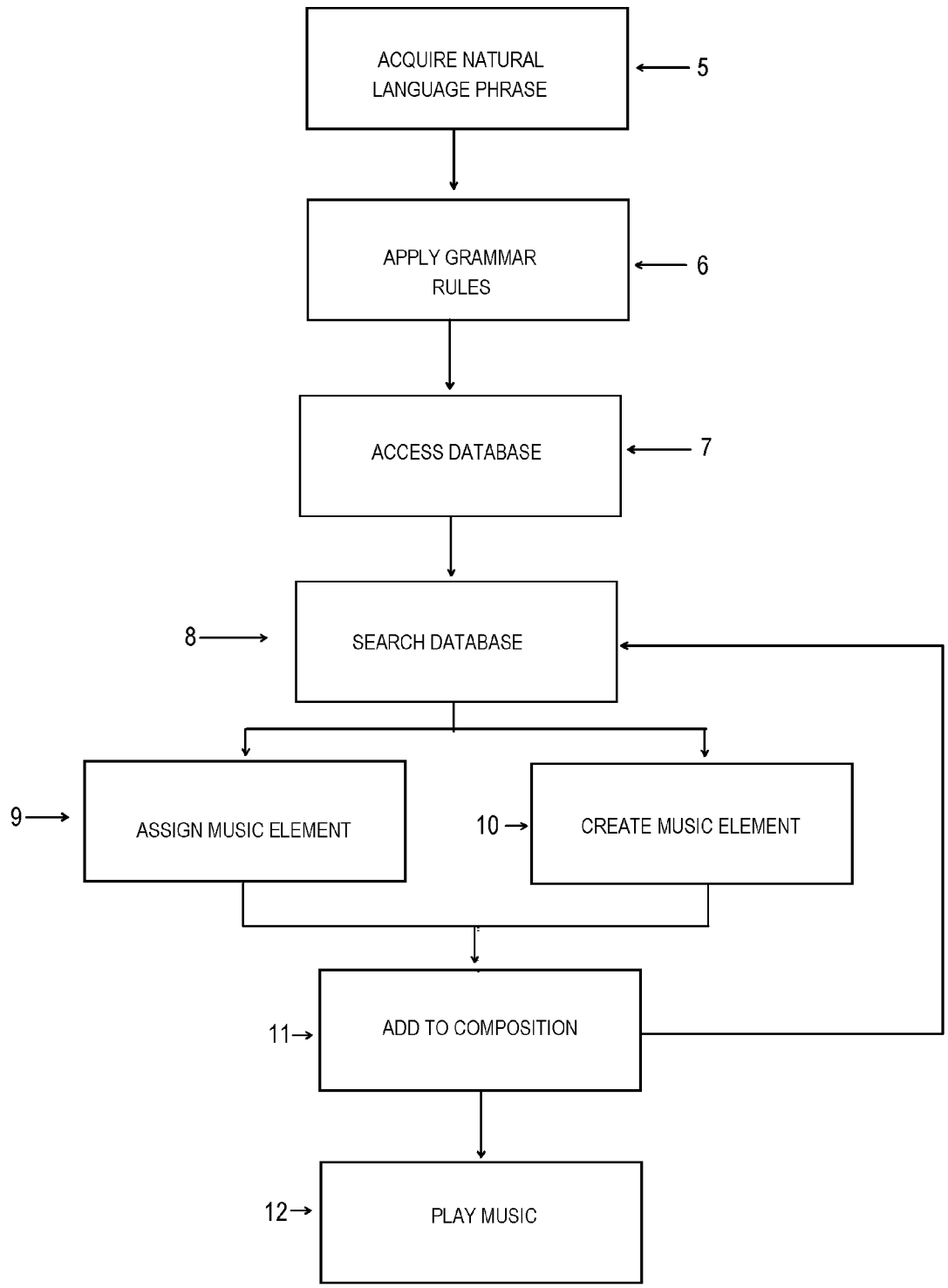
FIG. 2 is a representation of a methodology of certain processes of the present invention.

FIG. 2 is another representation of a method according to the present invention. According to this method, the computer acquires a natural language phrase, which may include a conversation from two or more persons 5. To the natural language phrase, the computer applies grammar rules 6. These rules may, for example, remove articles and other syntax, determine verb tense, identify the part of speech of a word, analyze whether a word is a compound word, etc.

Next the computer may access a database 7. The database may be indexed by parsed word elements that are cross-referenced to music elements. Accordingly, the database may be searched 8. During the search, a query is made as to whether the word as parsed is in the music word dictionary. If so, a musical element may be assigned and added to (or if it is the first word start) the music composition 9.

In some embodiments, one may collect an entire language phrase or conversation and then translate the phrase or conversation. Each music element that corresponds to the parsed word elements may then be added to a music buffer. After the entire phrase or conversation has been translated and added to the queue it may then be played. The process may be rapid, and for example, take a few milliseconds or less, such as on the order of nanoseconds. In other embodiments, users who participate in a conversation may elect to have only a portion such as the most recent statement be translated or played.

If the word is not in the word dictionary, a second dictionary may be accessed 10. This second dictionary may for example be a music letter dictionary that may be used to create a string of notes to generate a music element. The music element may be added to the composition 11.

If there are more parsed words to translate, the translation portion of the method may be repeated. Upon completion of translation, the music may be played 12.

The uses of the present invention include but are not limited to communication and collaboration between people who speak different languages. Although there is no limit on the ages of persons who can use the device, upon reading this disclosure, one can readily see how parents and schools would want to encourage their children and students to work with other children and students in distant countries. One can also readily appreciate the benefit to students with special needs.

Additionally, various displays and graphic effects can optionally be included in the various embodiments of the present invention. For example, a user may select from a library of still or video images, background images to be displayed with the music composition. Additionally, or alternatively, a user identification module may be included that attaches a user's geographic location (such as one or more of country, county, province, city, state, zip code, street) and a mapping module. Thus, when two people collaborate and a first user sends his composition to a second user, the second user will learn the identity of the first user. Moreover, in some embodiments, when the second user reads the first user's text and/or hears his composition, a map may appear, identifying the first user's location. The first user may opt to include a picture of himself when transmitting his text or composition that could be viewed by the second user. Alternatively, the system may be designed such that as a default or through user election, the user remains anonymous.

Also as noted above, the users may participate in a chat room, and be logged into the chat room at the same time, such that they can simultaneously be creating their music pieces. In these cases if there is a user identification module, users may see what the other has typed and sent immediately after its been sent, as well as the identity of the sender. Because there can be an unlimited number of exchanges between users, a lengthy conversation can be had. An entire conversation can be translated into music according to the various embodiments of the present invention, regardless of whether done live in a chat room or time delayed because users take part at different times.

When users speak different languages, they may opt to view the conversation only in their natural language, only in the language of their partner or both. Because translation and display occur locally, the system can be adjusted such that different users don't know in what language other users view or input messages.

In some embodiments, the systems and methods of the present invention are utilized on a client server. A user may first go into a web browser, but then download the program onto a user's computer. Thus, parsing and converting may be done locally.

EXAMPLES

Example I

Parsing Rules

Below is a set of parsing rules, one or more of which may be used in the various embodiments of the present invention.

1.0 Articles

"The", "a" and "an" are ignored. e.g. I have the (a) book=I have book.

2.0 Prepositions

"To" and "at" are ignored, e.g.

I am going to the movies tonight=I go movies tonight.

Send the song to me=Send song me.

I will be at home=I home (+future effect).

3.0 Verbs

Various forms of verb conjugations will not be translated to music, only past and present effects on simple present forms of the verbs will be in the musical form of the chat.

3.1 Tenses: Past and Future Tenses are Signified by Standard Effects (Reverb, Echo) Applied to the Simple Present Tense Verbs (and Some Object) Sounds, e.g.

I went to school today=I go (+past effect) school today.

We played after school=we play (+past effect) after school.

We will go to school tomorrow=we go (+future effect) school tomorrow.

(+past) means the past tense sound effect and (+future) means the future tense sound effect.

3.1.1 Verbs Ending in " . . . ing"

Verbs ending in " . . . ing" will have a separate musical sound than their simple present verbs.

3.2 Auxiliary (Helper) Verb Usage

"To be," "to have" and "to do" when used as helpers are ignored.

3.2.1 To Be

The forms of the verb "to be" in the present tense (am, are, is) are ignored, e.g.

I'm from Peru=I from Peru.

I'm American=I American.

We're going to eat=We going eat.

I'm reading the book=I reading book.

The show is tonight=Show tonight.

She is a great composer=She great composer.

The forms of the verb "to be" in the past (was, were) and future (will be) are ignored, but they trigger past and future effects depending on the text that follows. If followed by a verb ending in " . . . ing" the effect is applied to the verb; if followed by an object (e.g. I was there), the effect is applied to the object e.g.

We were playing in the park yesterday=we playing (+past) in park yesterday.

They will be moving next week=They moving (+future) next week.

We were going to go to the movies yesterday=We going (+past) go movies yesterday.

I will be in Los Angeles=I in Los Angeles (+future).

Will you be there?=You there (+future)?

Will your friends be there?=Your friends there (+future)?

When the phrase in the form of a question, "will be" is separated by a pronoun or noun and the future tense sound effect is applied to the object after the "be."

The "?" symbol has a musical sound that finishes a question phrase.

3.2.2 To Have

The verb "to have" is used like a normal verb only when it doesn't work as a helper (connected to another verb), e.g.

I have a computer=I have computer.

We had a party=We have (+past) party.

They will have a pizza=They have (+future) pizza.

"Have been," "had been" or "has been" when used to describe a location are replaced by "go (+past)", e.g.

I have been to New York=I go (+past) New York.

We should have been there=We should go (+past) there.

If they had been at the show=If they go (+past) show.

When used as a helper verb "to have" is a) ignored, but triggers a past tense sound effect, or b) tied to the verb "must" when used as "have to."

a) ignored, but triggers a past tense sound effect

To have is ignored when conjugated with other verbs, have+verb (in past tense)

have been+verb(ending in . . . ing) had+verb (in past tense) had been+verb(ending in . . . ing), and will always trigger a past tense sound effect on the verb that follows e.g.

We have played the game=We play (+past) game.

They had been working on the song=They working (+past) on song.

b) tied to the verb "must" when used as "have to"

"Have to, has to, have (has) got to"—all have the same sound as "must" e.g., I have to go now=I must go now.

"Had to, must have and should have"—all have the same sound as "must" but will trigger the past effect on the following verb e.g. We should have finished our homework=We must finish (+past) our homework.

"Will have to"—has the same sound as "must" but will trigger the future effect on the following verb e.g., We will have to save the song tomorrow=We must save (+future) song tomorrow.

3.2.3 To Do

The verb "to do" behaves like a normal verb when not used as a helper for another verb, usually with a past or future tense effect e.g.

I will do the mixing=I do (+future) mixing.

We did the job=we do (+past) job.

As a command it is present tense, e.g., Do it=Do it.

When used as a helper before other verbs "to do" it is ignored—this happens in questions and negatives.

E.g. In a question—

Do you want to play?=you want play?

Did you go to the movie?=you go (+past) movie?

Does your friend want to play?=Your friend want play?

E.g. In a negative—

I don't want to play=I no want play.

We didn't go to the movie=We no go (+past) movie.

Note: "no" and "not" have the same sound.

When it follows auxiliary verbs (except "will") "do it" is ignored, e.g.

We can (could/should/would) do it=We can (could/should/would).

Should they do it?=Should they?

When "do" follows "will," "do" is used with the future tense sound effect.

We will do it=We do (+future) it.

We will do our homework tomorrow=We do (+future) our homework tomorrow.

Will they do it?=They do (+future) it?

3.2.4 Can, could, May, Might, Ought, Shall, should, would, Must and Will

These auxiliary verbs and conditionals have rules.

Can, could, may, might, ought, shall, should, would and must all have their own music sound and on their own do not trigger tense effects.

"To be able to"="can."

I'm able to, he/she is able to, they're able to, we're able to=I, he, she, they, we can.

The negatives—could not (couldn't) and would not (wouldn't)—trigger past tense in the verbs that follow.

"Will" has no sound and always triggers future tense in the verb or object that follows. "Will" on its own it becomes "do (+future) it". e.g. I will=I do (+future) it.

3.3 Plural Effects

Plural of nouns will be the single noun sound plus an effect.

4.0 Sample Musical Phrases: Prophetic Examples

By way of example, Nicolle may be sitting in Paris, France and participating in a conversation with David in Los Angeles, Calif. Nicolle may be a native French speaker and she may choose to type in French. David, on the other hand, may be a native English speaker and choose to type in English.

David may log onto a chatroom and type: "Nicolle, are you there?"

Nicolle, who is already on line and bilingual may have selected to view the query in English and in French. She may input the following message in French: "Je suis ici."

After Nicolle sends the message, David's computer may automatically translate the response into English, and because he does not speak any French, he may elect a display only in English mode, such that on his screen, he sees the following response: "I am here."

By way of further example, David and Nicolle may continue their discussion in the chatroom. Thus, David and Nicolle have logged in and see each others' avatars on screen, where David is typing in English, and Nicolle is typing in French. Because Nicolle speaks both English and French, she has elected to see Dave's text displayed on her screen in English. Because Dave does not speak French, he has elected to see Nicolle's text displayed on his screen in English.

As soon as either participant completes a phrase by typing and pressing the ENTER key, the program simplifies the grammar; substitutes two letters for any word not found in the grammar list; finds a file index for each word or letter in a simplified grammar list; and for each file indexed cues one or more music elements to be played on both participants computers concurrently with the text being displayed. The conversation and processing of the conversation appears below. The parenthetical that follows "song" denotes the cueing for the particular portion of the conversation in an mp3 file.

Dave: Hi Nicolle! How are you?
simplified grammar: hi nicolle how you ?
indices: 1153_D (hi) 1568_D (letter n) 1206 D (letter i) 1194 D (how) 2728 D (you) 1842_D (question mark)
song: (conversation1.mp3)
Nicolle: Really great. How are you?
simplified grammar: really great how you ?
indices: 1876_D (really) 1053_D (great) 1194_D (how) 2728_D (you) 1842_D (question mark)
song: (conversation2.mp3)
Dave: Good, good, very good. When are you coming to California?
simplified grammar: good good very good when you coming to california ?
indices: 1045_D (good) 1045_D (good) 2553_D (very) 1045_D (good) 2633_D (when) 2728_D (you) 440_D (coming) 2431_D (to) 276_D (letter c) 0_D (letter a) 1842_D (question mark)
song: (conversation3.mp3)
Nicolle: Next week for sure!
simplified grammar: next week for sure
indices: 1588_D (next) 2628_D (week) 969_D (for) 2317_D (sure)
song: (conversation4.mp3)
Dave: What would you like to do?
simplified grammar: what you like to do_ft ?
indices: 2632_D (what) 2728_D (you) 1429_D (like) 2431_D (to do future tense) 705_D 1842_D (question mark)
song: (conversation5.mp3)
Nicolle: Let's see the zoo.
simplified grammar: let see zoo
indices: 1409_D (let) 2049_D (see) 2733_D (zoo)
song: (conversation6.mp3)
Dave: OK let's plan on it!
simplified grammar: ok let plan on it
indices: 1637_D (ok) 1410_D (lets) 1745_D (plan) 1639_D (on) 1268_D (it)
song: (conversation7.mp3)

Figure 3:
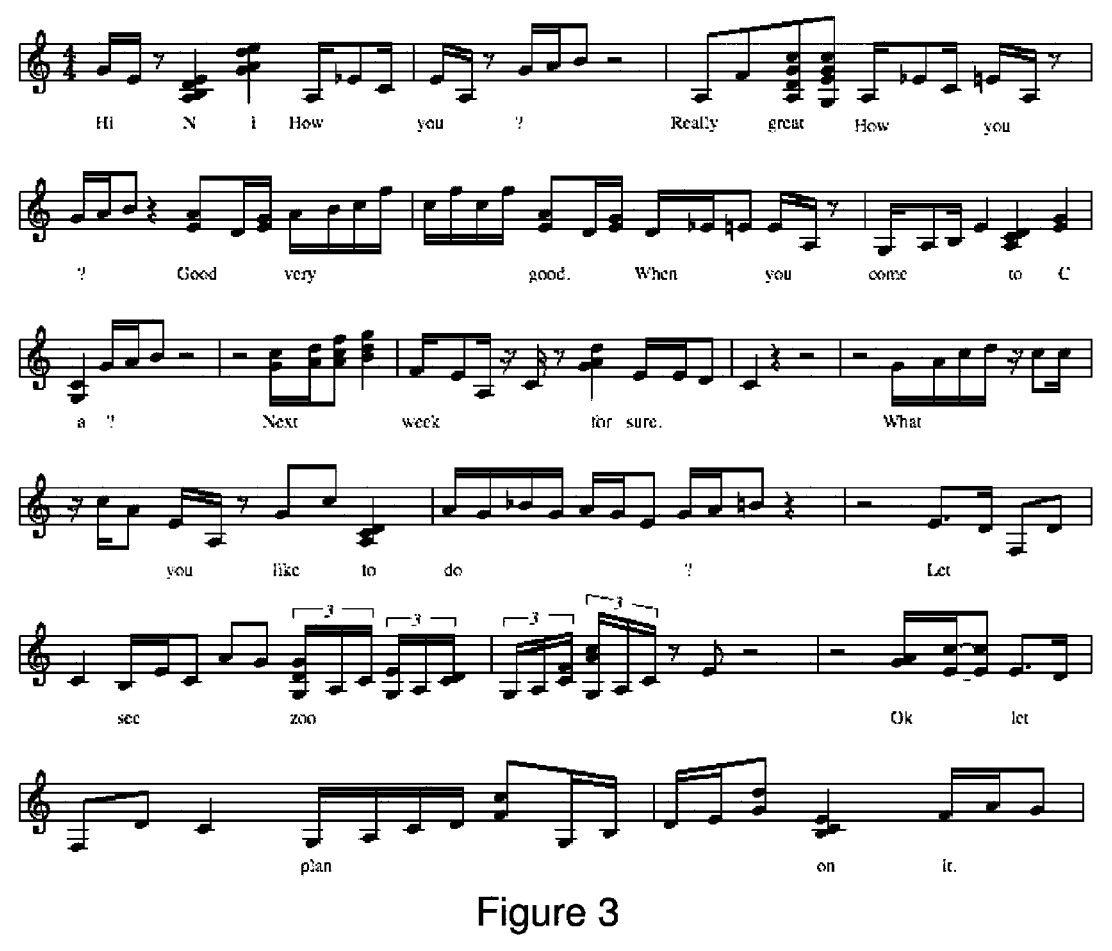

The combined song (conversation1.mp3 through conversation7.mp3) with backing music loop may be stored as conversation.mp3. The score is shown in FIG. 3 with, for reference, the words that correspond to the notes.

This application discusses specific embodiments of the present invention. The specific features described herein may be used in some embodiments, but not in others, without departing from the spirit and scope of the invention as set forth in the foregoing disclosure. However, unless otherwise specified or apparent from context, any feature described as being used in connection with any one embodiment, may be used in any other embodiment. Further, it will be appreciated by those of ordinary skill in the art that the illustrative examples do not define the metes and bounds of the invention. For example, the present invention should not be limited by software/program, computing environment, or specific computing hardware.

What is claimed:

1. A method for translating a textual message into a semantic music composition, said method comprising the steps of:
   (a) receiving a first text message, including a plurality of words, through a user interface;
   (b) parsing the first text message through an automated computer parsing program to obtain a parsed message representing a semantic meaning of the first text message with a plurality of parsed words in an order;
   (c) automatically selecting a music element for each parsed word in the parsed message from a database that correlates parsed words to music elements;

(d) creating a music composition by combining said selected music elements in the order of the parsed words; and (e) outputting the music composition in an audio format, whereby the music composition is the same as a music composition created from a second text message having the same semantic meaning, wherein the first text message is in a natural language and the second text message is in a different natural language.

2. The method according to claim 1, wherein the user interface is a smart phone.

3. The method according to claim 1 further comprising outputting the music composition in metered time.

4. The method according to claim 1 further comprising outputting the music composition in metered pitch.

5. The method according to claim 3 further comprising outputting the music composition in metered pitch.

6. The method according to claim 5, wherein the music composition further comprises a pre-recorded loop composition.

7. The method according to claim 6 further comprising:
applying steps (a) to (e) to another text message having a different semantic meaning to create and output a different music composition.

8. The method of claim 1 wherein the first text message is prepared in a first natural language by a first user at a first computer associated with the first user and at least steps (a) and (b) are performed on the first text message via the first computer, the method further comprising:

(f) transmitting at least the parsed message representing the semantic meaning of the first text message to a second user at a second user interface associated with a second computer; and (g) performing steps (c) through (e) via the second computer so that the music composition is played for the second user.

9. The method of claim 8 wherein steps (c) through (e) are performed via both the first and the second computers.

10. The method of claim 8 wherein step (f) further comprises:
transmitting the first text message in the first natural language along with the passed message.

11. The method of claim 8 wherein the second user employs a different natural language and, in accordance an option selectable by the first user, step (g) further comprises:
displaying the first text message to the second user via the second computer in the first or the different or both natural languages.

* * * * *